Nov. 24, 1925.  1,562,709
H. W. McNUTT
LAWN MOWER
Filed Dec. 6, 1921   3 Sheets-Sheet 3
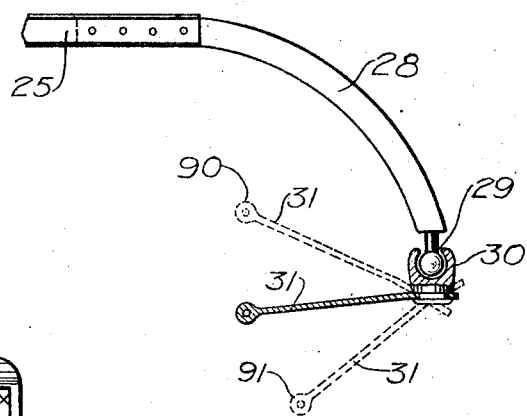
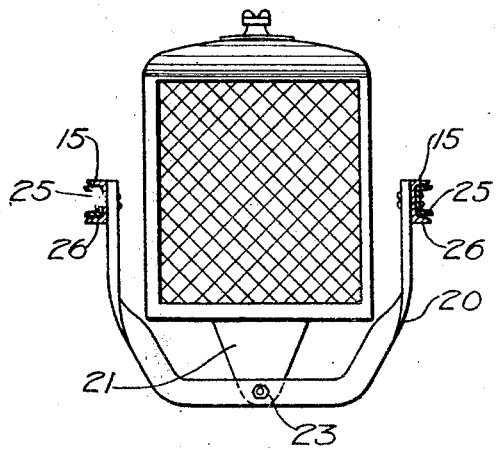
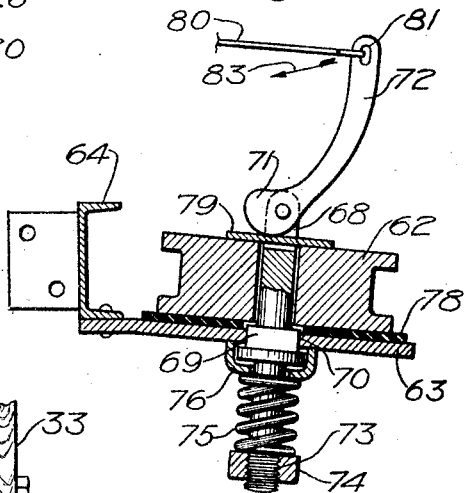
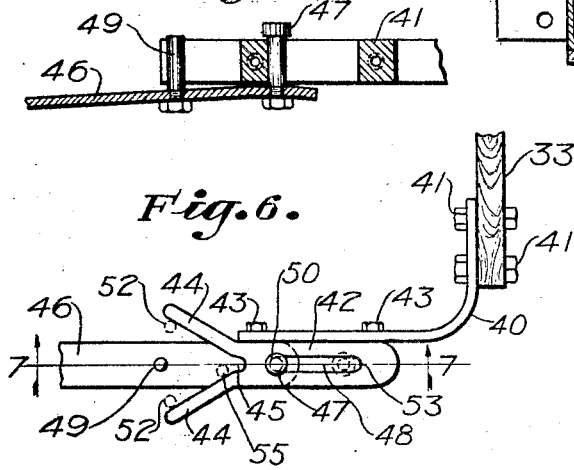
INVENTOR:
HARRY W. McNUTT,
BY *Garland Harris*
ATTORNEYS.

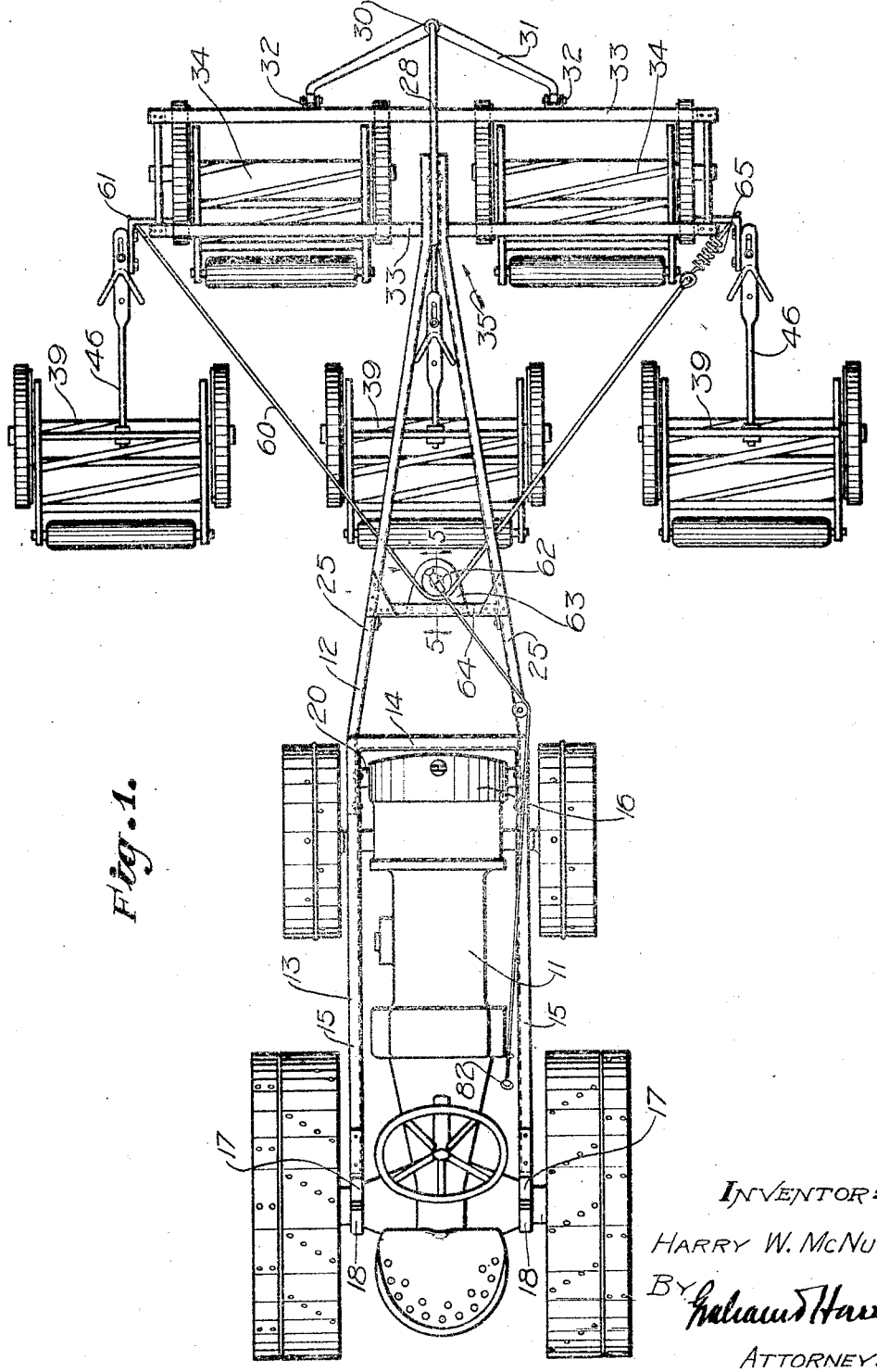

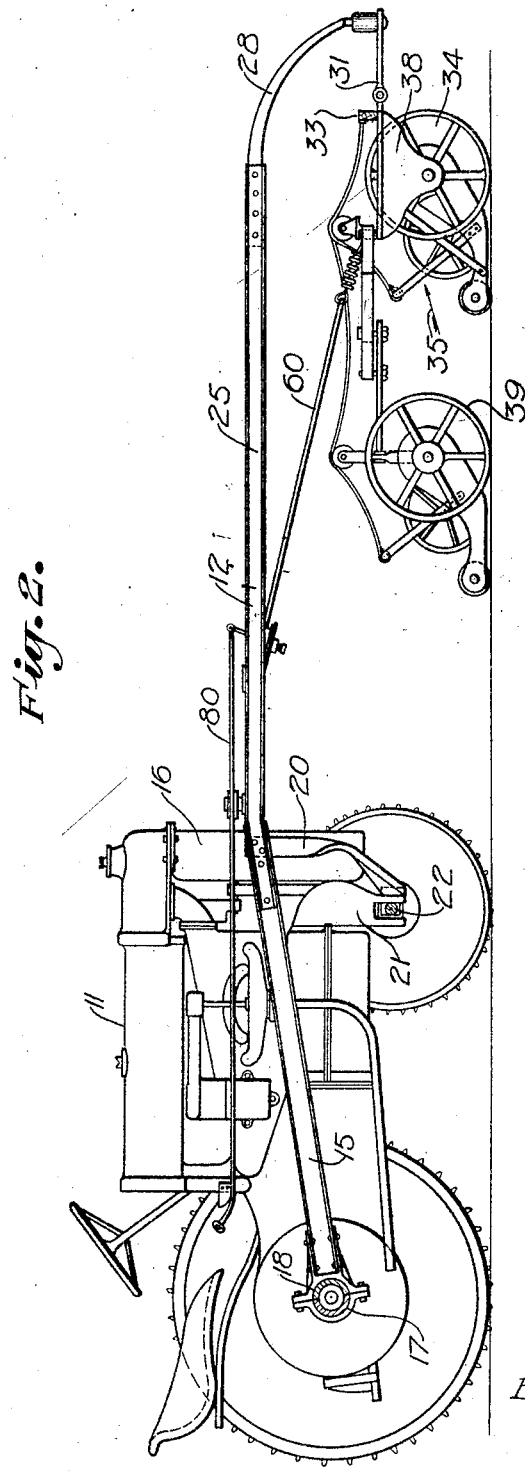

Patented Nov. 24, 1925.

1,562,709

UNITED STATES PATENT OFFICE.

HARRY W. McNUTT, OF LOS ANGELES, CALIFORNIA.

LAWN MOWER.

Application filed December 6, 1921. Serial No. 520,231.

*To all whom it may concern:*

Be it known that I, HARRY W. McNUTT, a citizen of the United States, residing at Los Angeles, in the county of Los Angeles and State of California, have invented a new and Improved Lawn Mower, of which the following is a specification.

This invention relates to power mowing machines and is more particularly a mower attachment for tractive vehicles.

It is an object of my invention to provide a mowing machine especially adapted to use on uneven ground such as encountered in public parks and the fairways of golf links.

It is also an object of my invention to provide a mowing machine which may be operated in corners ordinarily inaccessible to the present type of power mowers.

It is also an object of my invention to provide a mowing machine in which the mower unit is visible to the operator thus enabling him to guide the mowers along a previously cut swath with greater facility than is ordinarily possible.

I accomplish the fulfillment of these objects in the provision of a mowing machine in which the mowers are drawn in front of a propellable vehicle, as will hereinafter be fully set forth, thus placing the mowers in full view of the operator and making it possible to propel the mowers in ordinarily inaccessible corners.

It is a further object of my invention to provide in such a mowing machine a means for stabilizing the mower unit, thus facilitating the adherence thereof to a set course.

It is also a further object of my invention to provide in this mowing machine, draft connections for use between the mowers of the mower unit which will be flexible when the mowing machine is traveling forward, but which will maintain the mowers in rigid alignment when the mowing machine is being backed up.

Other objects and advantages will become evident hereinafter.

Referring to the drawings which are for illustrative purposes only;

Fig. 1 is a plan view of a mowing machine embodying the features of my invention.

Fig. 2 is an elevational view of the mowing machine shown in Fig. 1, certain of the wheels of the tractor shown therein being removed to illustrate the manner in which the draft structure is mounted upon the tractor.

Fig. 3 is a detail view of the forward end of the draft structure showing the manner in which flexible connection is made to the mower unit.

Fig. 4 is a front view of the tractor radiator and the draft structure supporting yoke showing the manner in which the yoke is secured to the tractor.

Fig. 5 is a section taken substantially upon the line 5—5 of Fig. 1; this view illustrating the mower unit stabilizer locking mechanism.

Fig. 6 is a plan view of the draft connection I use between certain of the mowers of the mower unit.

Fig. 7 is a section through the draft connection shown in Fig. 6 taken upon a plane represented by the line 7—7 of that figure.

In the embodiment of my invention shown in the drawing, I employ a tractor 11 upon which is mounted a forwardly extending draft structure 12. With the use of this particular form of tractor, it is convenient to construct the draft structure from structural steel; therefore I have shown a channel 13 bent to provide a front portion 14 extending across the front of the radiator 16 of the tractor 11 and having clamps 17 upon the ends thereof; these clamps being adapted to surround the rear axle housing 18. A yoke 20 supports the forward end of the member 13, this yoke being forged from bar steel into the form shown in Fig. 4 and being secured to the king post 21 which supports the front axle 22 of the tractor by such suitable means as a bolt 23. Channels 25 are mounted forwardly between legs 26 of the channel member 13. These channels 25 being converged as shown in Fig. 1 support therebetween a downwardly bent arm 28 having formed upon the end thereof a ball 29 which fits into a socket member 30 mounted upon a draft yoke 31 which hinges at 32 to a frame 33 supporting the forward mowers 34 of the mower unit 35; thus providing a flexible connection between the draft structure and the mower unit.

The mower unit 35 may consist of any convenient number of mowers suitably joined together, the arrangement I employ in the practice of my invention consisting of a forward pair of mowers 34 attached to the frame 33 by convenient brackets 38 and trio of follower mowers 39 which are drawn behind the mowers 34 in staggered relationship thereto so that the centrally disposed mower 39 will cover the strip which would be missed between the forward mowers 34.

The mowers 39 are drawn by the draft structure through draft connections between the frame 33 and the mowers 39 which are flexible when the mowers are being propelled in a forward direction; but which connections are adapted to maintain the mowers 39 in rigid traveling alignment when the mower unit is being backed, so that these mowers cannot swing to one side when the direction of travel of the mowing machine is reversed, which condition would exist without the use of such an arrangement as I have devised. Upon plates 40, adapted to be mounted upon the frame 33 by means of bolts 41, I mount a slotted head 42 with set screws 43. Rearwardly extending from the member 42 are diverging arms 44 having formed between the inner ends thereof a pocket 45. Upon the underside of the member 42 I place a draft bar 46 which mounts a pin 47 which extends upwardly through a slot 48 provided in the body of the member 42. Slightly forward upon the draft bar 46 I mount a pin 49, this pin being adapted to engage with either of the diverging arms 44 when the draft bar 46 is swung to either side of the central position shown. When the mower unit is drawn forward, the pin 47 rests against the rearward end 50 of the slot 48 and the pin 49 is in the position shown in full lines in Fig. 6, in which position of the pin 49 it is possible for the bar 46 to swing at a considerable angle from the position of alignment shown in that figure, the extreme positions of the pin 49 being indicated by the dotted circles 52. It will be perceived that when the mower unit is backed up, the draft head 42 will be moved relatively rearwardly until the pin 47 strikes the forward end 53 of the socket 48, the rearward motion thereupon being transmitted to the arm 46 and thereby to the particular mower to which the arm is attached. When the pin 47 is against the end 53 of the slot 48, the pin 49 rests in the pocket 45 between the arms 44, thus providing a two point engagement between the head 42 and the arm 46, which engagement holds the mowers 39 in the positions of alignment in which they are shown in Fig. 1. At the time the mower unit is backed and the mowers 39 are out of alignment, each of the pins 49 engages the inner surface of one of the diverging arms 44 and by these arms are directed through the position indicated at 55 into the pocket 45, thus providing an automatic means of alignment when the mowing machine is reversed in its direction of movement.

It is the natural tendency of a mower unit such as I have shown at 35 to swing from side to side as it is drawn forwardly, this being especially so when the mower unit is drawn from a central point. As a stabilizing means to prevent this unsteady and swinging action of the mower unit, I provide a cable 60 which attaches at 61 to the front frame member, being from thence carried to a sheave 62 which is mounted upon a plate 63 which extends forwardly in a central position from a cross brace channel 64 extended between the converging channels 25. After making several turns around the sheave 62, the cable 60 is carried forwardly to the opposite end of the frame 33, to which it is connected by a spring 65 serving to take up any slack due to the stretching of the cable.

In Fig. 5 I show the manner in which the sheave 62 is maintained upon the plate 63. A pin 68 having a square portion 69 formed thereupon extends through a correspondingly square hole 70 in the plate 63. The upper end of the pin 68 is provided with a slot to accommodate a cam 71 which is formed upon the end of a lever 72, the lower end 73 of the pin 68 being threaded so that a nut 74 which regulates the compression of a spring 75 against a cup member 76 may be screwed thereupon. Between the sheave 62 and the plate 63 is placed a sheet of fibre 78 or other material having high frictional characteristics. By tightening the nut 74 upon the threaded portion 73 of the pin 68, the cam 71 in the released position shown in the figure, may be caused to bear against the frictional material 78. It will be seen that by this means, the resistance against rotation of the sheave 62 may be adjusted to suit the working conditions.

A wire or cable 80 makes connection with the slot 81 in the upper end of the cam arm 72 and is carried rearwardly along the side of the tractor 11 to a position in which it may be pulled by the operator by means of a suitable handle 82.

When it is desired to back the mowing machine, the operator pulls upon the handle 82, this pull being transferred to the lever 72 causing it to be drawn rearwardly in the direction of the arrow 83 and causing the cam 71 to clamp securely down upon the plate 79, thus locking the sheave 62 securely against rotation. As the sheave 62 cannot be rotated by the cable 60 wound therearound, it is impossible for the frame 33 to swing out of alignment as the mower is reversed, and it is impossible for the mowers 39 to swing from their positions of alignment relative to the frame 33 owing to the automatic action of the draft connections between the frame 33 and the mowers 39 as hereinbefore explained.

When the mowing machine is being operated over uneven grounds, the mower unit may drop into depressions or may ride over high spots so that its vertical position relative to the draft structure 12 varies considerably. The flexible connection which I employ provides for a considerable variation in the vertical relationship between the mower unit and the draft structure, as shown in Fig. 3. When the mower unit rides over high spots, the yoke 31 may be carried to the position shown in dotted lines at 90, and when the mower unit drops into a hollow, an extreme relative position of the yoke 31 may be assumed as indicated by the dotted lines 91.

I claim as my invention:

1. In a mowing machine, the combination of: a vehicle; a mower unit disposed in front of said vehicle; a draft structure extending forwardly over said mower unit from said draft vehicle; a flexible connection between the forward end of said draft structure and said mower unit, whereby said mower unit may be pulled by said draft structure as said vehicle is propelled; frictional means for resisting the lateral swing of said mower unit around said flexible connection; and means for maintaining said mower unit in alignment when the direction of movement of said mowing machine is reversed.

2. In a mowing machine, the combination of: a vehicle; a mower unit disposed in front of said vehicle; a draft structure extending forwardly over said mower unit from said draft vehicle; a flexible connection between the forward end of said draft structure and said mower unit, whereby said mower unit may be pulled by said draft structure as said vehicle is propelled; and means for maintaining said mower unit in alignment when the direction of movement of said mowing machine is reversed.

3. In a mowing machine, the combination of: a vehicle; a draft structure extending forwardly from said vehicle; a flexible draft connection upon the forward end of said draft structure; a mower frame attached to said draft structure by said flexible connection; follower mowers behind said mower frame; flexible means between said follower mowers and said mower frame whereby said follower mowers are pulled behind said mower frame; frictional means for resisting a free lateral movement of said mower frame around said draft connection; means for locking said mower frame in a position relative to said draft structure; and means for locking said follower mowers in positions in traveling alignment with said mower frame when it is desired to back said mowing machine.

In testimony whereof, I have hereunto set my hand at Los Angeles, California, this 28 day of November 1921.

HARRY W. McNUTT.